(12) United States Patent
Williams et al.

(10) Patent No.: US 6,618,988 B2
(45) Date of Patent: Sep. 16, 2003

(54) LIGHTWEIGHT GREENHOUSE STRUCTURE FOR RAPID ASSEMBLY, DISASSEMBLY, STORAGE AND TRANSPORT

(76) Inventors: David Allen Williams, 512 Pecan St., Carbondale, IL (US) 62901; Carol Laycock Williams, 512 Pecan St., Carbondale, IL (US) 62901

( * ) Notice: Subject to any disclaimer, the term of this patent is extended or adjusted under 35 U.S.C. 154(b) by 0 days.

(21) Appl. No.: 09/963,622

(22) Filed: Sep. 27, 2001

(65) Prior Publication Data

US 2002/0059749 A1 May 23, 2002

Related U.S. Application Data

(60) Provisional application No. 60/252,046, filed on Nov. 20, 2000.

(51) Int. Cl.[7] .................................................. A01G 9/14
(52) U.S. Cl. ........................................... 47/17; 135/122
(58) Field of Search ........................ 47/19.1, 17; 52/63, 52/244; 135/121, 122, 143, 144; 411/32, 60.1, 72

(56) References Cited

U.S. PATENT DOCUMENTS

| | | | | |
|---|---|---|---|---|
| 3,651,545 A | * | 3/1972 | Hara | 411/15 |
| 4,114,509 A | * | 9/1978 | Poe | 411/80.2 |
| 4,502,193 A | * | 3/1985 | Harmon et al. | 411/208 |
| 5,479,744 A | * | 1/1996 | Meyer | 47/17 |
| 5,562,375 A | * | 10/1996 | Jackson | 411/48 |
| 5,660,002 A | * | 8/1997 | Lashinger | 135/119 |
| 5,855,347 A | * | 1/1999 | Hollingsworth et al. | 411/80.1 |
| 5,906,217 A | * | 5/1999 | Hill | 135/124 |
| 6,098,335 A | * | 8/2000 | Brown, Jr. | 47/17 |

OTHER PUBLICATIONS www.skytent.com, Brooks Products, Chapel Hill, NC.*

* cited by examiner

Primary Examiner—Peter M. Poon
Assistant Examiner—Jeffrey L. Gellner
(74) Attorney, Agent, or Firm—Russell N. Muehleman

(57) ABSTRACT

A greenhouse has a frame of standard PVC tubes and PVC fittings. A rectangular base frame supports a plurality of vertical tubes, which, in turn, support a rectangular gable-type roof frame. Some of the tube-to-fitting couplings are friction-fit connections, some are glued connections and others are quick connect/disconnect connections for rapid assembly and disassembly of the greenhouse. A poly cover includes a center portion which extends from the base frame over the vertical tubes and the gabled roof frame and is coupled thereto by quick-connect/disconnect retainers, and a pair of end portions are releasably connected to respective ends of the center portion by double-pull zippers having box and pin connectors for variable, regulated ventilation and complete removal of the end portions.

10 Claims, 2 Drawing Sheets

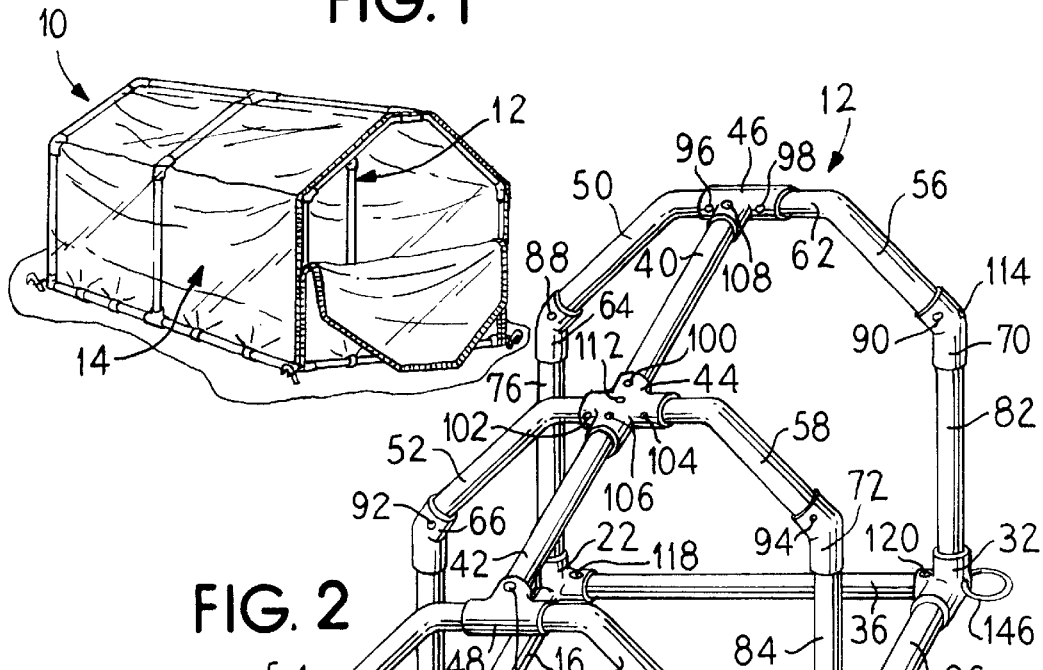
FIG. 1
FIG. 2
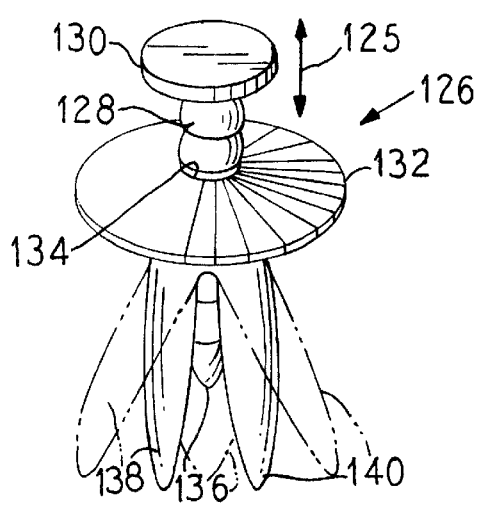
FIG. 3
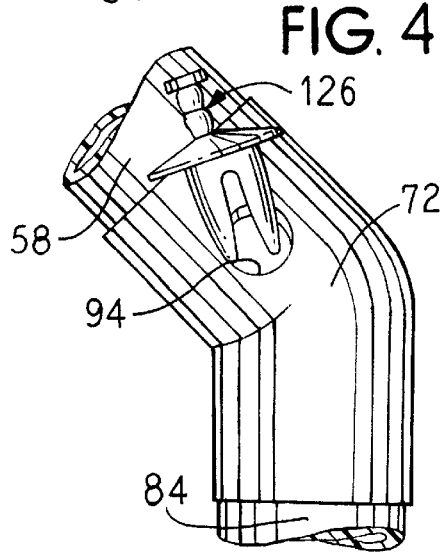
FIG. 4

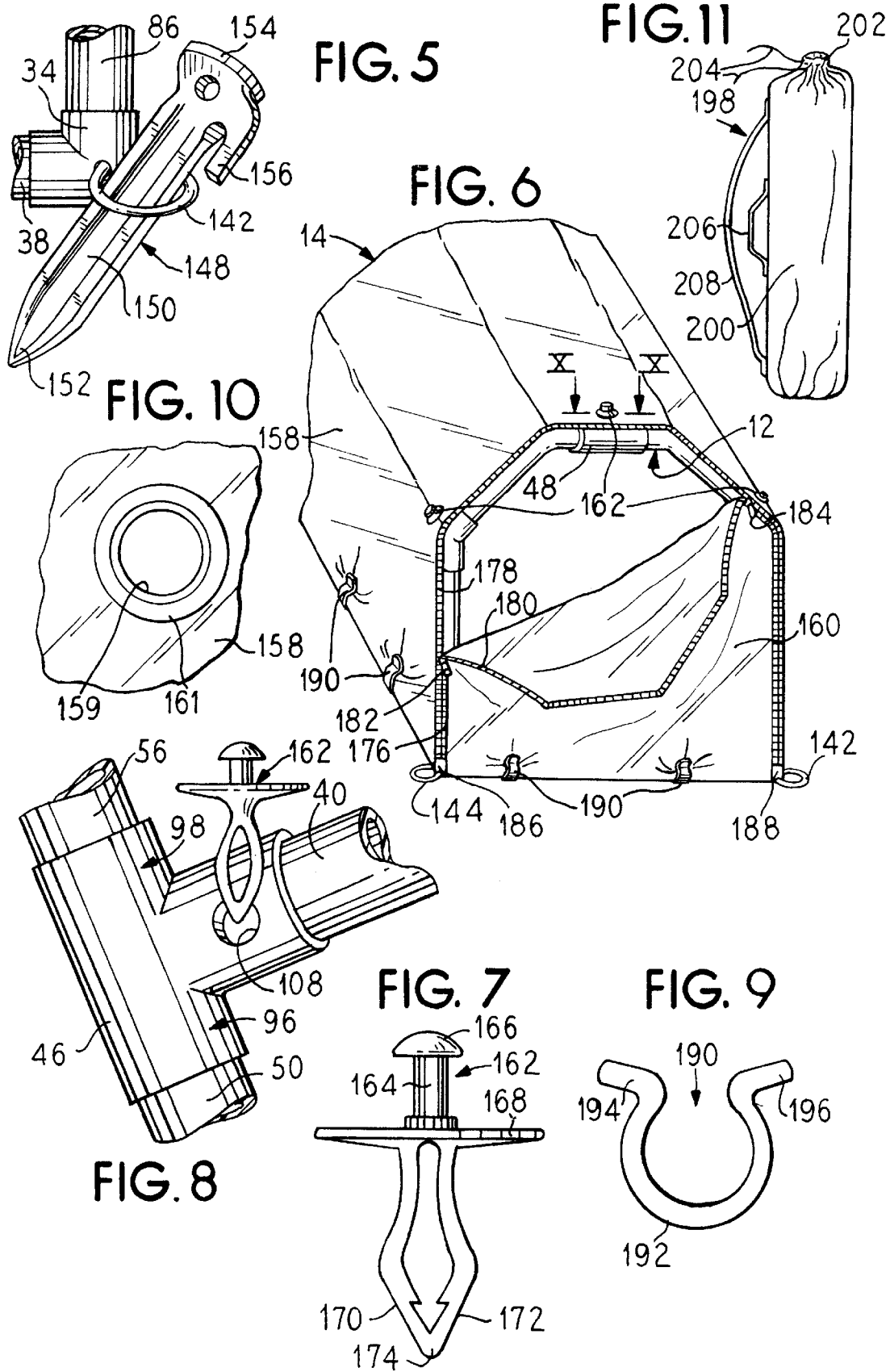

LIGHTWEIGHT GREENHOUSE STRUCTURE FOR RAPID ASSEMBLY, DISASSEMBLY, STORAGE AND TRANSPORT

The present application is related to and is based on a provisional application No. 60/252,046,filed Nov. 20, 2000, and which is fully incorporated herein by this reference.

BACKGROUND OF THE INVENTION

1. Field of the Invention

The present invention relates to greenhouses, and is particularly concerned with a hobby-type, miniature greenhouse having a frame constructed of standard tubular plumbing segments and standard plumbing fittings, which when disassembled, may be stored and/or transported in a drawstring bag.

2. Description of the Prior Art

As pointed out in the above-referenced provisional application, the growing of garden vegetables and flowers is limited at various locations on earth by temperature extremes, aridity, excessive precipitation and damage by insects and animals. Excessive cold and hot air temperatures and soil temperatures, frost and freeze limit the growing season. In order to extend the growing season, seeds must be started in a protected environment, soils must be heated or cooled and the plants must be protected from frost and freeze. And, because of an excessive moisture problem, it may be necessary to enclose or shade plants to reduce evapotranspiration. Common structures for protecting plants from the foregoing are cold frames, greenhouses and row protectors. Plants may be protected from insects by an agricultural fabric, which is also called a floating row cover, a light-weight woven material that permits sufficient sunlight therethrough for plant growth, but excludes insects. Animal pests are also excluded from garden plants by use of a physical barrier such as bird netting or hardware cloth as a physical barrier.

Cold frames, greenhouses and row covers are not effective solutions for the above problems for the non-commercial gardner because of the prohibitive costs. Most require power tools for assembly or require professional installation, are typically constructed of rigid materials and are to be considered non-portable structures which require periodic repair and maintenance which can be costly and comsume a great amount of time.

Heating and ventilation of greenhouses are also of particular concern for non-commercial gardners. "Hot" greenhouses require artifical heating, which involves the added costs of heaters and fuel, making the structures more complex and expensive and financially out of the reach of many non-commercial gardners. Ventilation is also necessary to prevent overheating and is performed either manually or by automatic control. Again, time and cost come into the picture "Cold" greenhouses also require periodic ventilation of excessive heat. Also, manually or automatic opening and closing of vents are required.

Reference should be taken to the above-referenced application for other problems associated with currently-available coldframes row covers and greenhouses. Reference may also be taken to U.S. Pat. No. 2,649,102 for a zipper-type opening, and to U.S. Pat. No. 5,479,744 and U.S. Pat. No. 6,098,335, both fully incorporated herein by this reference, for the use of hook and loop-type fastened openings.

Tubular frame structures may be found in U.S. Pat. No. 2,928,405, U.S. Pat. No. 5,479,744, U.S. Pat. No. 5,598,668, U.S. Pat. No. 5,660,002, U.S. Pat. No. 5,709,238, U.S. Pat. No. 6,098,335, U.S. Pat. No. 6,141,902, U.S. Pat. No. 6,185,877 and U.S. Pat. No. 6,170,503, all fully incorporated herein by this reference. These references also disclose various techniques for joining frame members together and for securing a cover to the frame.

SUMMARY OF THE INVENTION

An object of the invention is to provide an easily transportable, light-weight, greenhouse for use by non-commercial gardners.

Another object of the invention is to provide such a greenhouse which is also easily assembled and disassembled.

A further object of the invention is to provide a greenhouse of the type described whose components, when disassembled, can be readily placed into a drawstring bag for storage and transport.

Yet another object of the invention is to provide a greenhouse of the type described which is provided with variable, regulated ventilation.

According to a feature of the invention, a greenhouse frame is assembled from a plurality of polyvinylchloride (PVC) tubing cut to specified lengths and standard PVC fittings, and a plurality of push-in/pull-out retainers of, for example, polystyrene. The greenhouse frame may be essentially symmetrical and include a rectangular base frame for supporting the greenhouse on a supporting surface, a gable-type roof frame and a plurality of upright or vertical members for supporting the roof frame above the base frame.

According to another feature of the invention, a cover includes a top and side portion which extends from both sides of the base frame over the vertical members and the roof frame. This first cover portion is attached to at least some of the vertical members and to the roof frame by another plurality of push-in/pull-out retainers and is clipped to the base frame by a pluraliity of Ω-shaped clips.

According to yet another feature of the invention, the cover includes easily and totally removable end portions, each of which is attached to the top and/or center portion by a double-pull zipper having box and pin ends for complete disconnection and removal of the end portions. The double pull feature also permits the end portions to be partially unzipped in both directions to "peel" the end portion downwardly by various amounts to regulate ventilation.

BRIEF DESCRIPTION OF THE DRAWINGS

Other objects, features and advantages of the invention will be understood from the detailed description below, taken in conjunction with the accompanying drawings, on which:

FIG. 1 is an end view of a greenhouse constructed in accordance with the invention as seen from either end since the greenhouse is symmetrical;

FIG. 2 is an end view of the frame of the greenhouse of FIG. 1, the frame also being essentially symmetrical;

FIG. 3 is a perspctive view of a retainer for assembling the frame of the greenhouse;

FIG. 4 is a fragmentary side view of a frame joint and showing a retainer for that joint;

FIG. 5 is a fragmentary side view of a base corner joint with an anchoring stake estending through an O ring through the fitting of the joint;

FIG. 6 is another end view, similar to that of FIG. 1, further showing retainers for the greenhouse cover and better showing clips for securing the cover to the base;

FIG. 7 is a side view of a retainer as used in FIG. 8;

FIG. 8 is a perspective top view of a ridge end T fitting of the greenhouse frame and a retainer of the type illlustrated in FIG. 7 for securing the cover to the ridge of the frame;

FIG. 9 is an end view of a clip for attaching the greenhouse cover to to the greenhouse frame as employed in FIGS. 1 and 6;

FIG. 10 is a frgmentary view of a portion of the cover, as viewed in th direction of the arrows X—X on FIG. 6, showing the reinforcement of securing apertures of the cover for attachment to the greenhouse frame; and FIG. 11 is a side view of a drawstring bag for storing and transporting the components of the greenhouse after disassembly thereof.

DESCRIPTION OF THE PRESENTLY PREFERRED EMBODIMENTS

Referring to FIG. 1, a greenhouse is shown generally at 10 as comprising a greenhouse frame 12 supporting a cover 14. The greenhouse cover 14 includes a pair of zippered end portions (only one being visible) which will be discussed in greater detail below.

Referring to FIG. 2, the greenhouse frame 12 comprises a base frame including, in this example, four base tubes 16, 18, 26 and 28. All of the tubes used in the frame are standard plyvinylchloride (PVC) plumbing tubing cut to the proper lengths. The tubes 16 and 18 are connected in tandem and axial alignment by a tee (T) fitting 29 between and connected to a pair of side outlet (SOL) end fittings 22 and 24. All of the fittings used in the frame are also PVC standard plumbing fittings. The tubes 26 anf 28 are also connected in tandem and axial alignment by a T fitting 30, and are connected between and to respective SOL end fittings 32 and 34.

The two sides of the base frame are connected together by a pair of end tubes 36 and 38 which are respectively connected between the SOL end fittings 22, 32 and 24, 34.

The gable-type roof frame for supporting the cover 14 comprises a ridge constructed of a pair of tubes 40 and 42 which are connected in in tandem and in axial alignment by a cross fitting 44 and connected between and to a pair of T fittings 46 and 48. A plurality of rafter tubes 50, 52, 54, 56, 58 and 60, each including an angled section, as shown at 62, are connected to the respective T and cross fittings 44, 46 and 48. The connections of the base tubes 16, 18, 26, 28 to the fittings 20, 22, 24, 30, 32, 34 are friction fits for ease of assembly, disassembly and sttorage of the greenhouse components and and do not present stability problems due to the integrity of the remaing joints which, as discussed in greater detail below, are glued or releasably pinned together.

A plurality of upright members are provided to support the roof frame above the base frame. Each of the upright members includes a tube 76, 78, 80,82,84,86 and a respective angled fitting 64,66,68,70,72,74. The tubes 76,78,80, 82,84,86 are each received and glued in its respective angular transition fitting 64,66,68,70,72,74 at its upper end and recieved and glued in respective base fittings 20,22,24, 30, 32, 34 at their lower ends.

The connections of the end tubes 36, 38 to the fittings 22, 32 and 24, 34, the connection of the rafter tubes 50, 52, 54, 56, 58, 60, to the fittings 64, 66, 68, 70, 72, 74 by way of aligned apertures in the fittings and pipes as indicated at 88, 90,92, 94,102, 104, 106, 108, 110, 118,120,122,124 form quick connect/disconnect joints or connections which receive and include a respective push-in/pull-out retainer for rapid assembly and disassembly of the greenhouse frame. Inasmuch as the frame is essentially symmetrical and a view from an end is essentially a mirror of the other end, the fittings and respective rafter tubes 54, 68 and 60,74 have a similar registered aperture structure for receiving respective retainers.

The fittings 64,68, 70,74,48 are also provided with apertures (only certain ones being shown because of the angle of view) for receiving respective push-in/pull-out retainers.

An example of a joint retainer 126 is illustrated in FIG. 3. The retainer 126 comprises a shaft portion 128 with a flat head 130, a flange '132 slidably recieves the shaft 128 through an aperture 134, as indicated by the double arrow 125. The shaft carries a distal camming end 136 for forcing apart a pair of inwardly-biased fingers 138, 140 as the shaft moves through the aperture 128 (downwardly as viewed on the drawing). The fingers 138,140 are carried by the flange and with the shaft portion pulled up (as viewed on the drawing) may be pinched inwardly towards one another for insertion, as illustrated in FIG. 4. When inserted, the flange 132 engages the fitting and acts as a stop. The head 130 may then be pressed to cause the camming end 136 to fan out the fingers 138, 140. Upon disassembly, the head, shaft and camming end ares pulled back to release the fingers.

Referring to FIGS. 2 and 5, the end SOL fittings are provided with O rings (only 142, 144,146 being shown because of the view, a fourth being provided at the fitting 22) through respective holes therein. The O rings are for anchoring the structure and, as shown in FIG. 5, may be used in conjunction with stakes for securing the greenhouse to the ground.

As shown in FIG. 5, the O ring 142 receives a stake 148 therethrough which includes an elongate body 150 including a flat head 154 at its proximal end for driving the stake and a pointed distal end 152 for accomodating driving the stake into the ground. The elongate body 150 carries a hook 156 adjacent to and opening away from the driving head for receiving an O ring, such as the O ring 142 illustrated, for anchoring the greenhouse to the ground. When used on a potting bench or the like, the O rings may be used in conjunction with ties, staples, nails, or other suitable fasteners.

In FIG. 6, the greenhouse is illustrated as including the cover 14 ssecured to the frame 12. The cover 14 includes a first or center cover portion 158 which extends from the base frame on one side of the greenhouse to the base frame on the other side of the greenhouse via and over the roof frame and is releasably attached to the greenhouse frame as shown in FIG. 6 by the structures shown in FIGS. 7, 8, 9 and 10 in buttoning and unbuttoning types of operations. The cover 14 also inludes a pair of end portions 160 (only one being visible, but that being the mirror image of the other). Each end portion 160 is removably attached to the portion 158 by a zipper 176 which includes a pair of elongate toothed matable portions 178 and 180, with self-adhesive backings, respectively attached to the cover portions 158 and 160. The attachment may be by way of this self-adhesive backing structure structure; however, it is presently preferred to sew the elongate toothed zipper portions to the cover portions 158 and 160. A material for the cover which is suitable for sewing is known as woven polyethelene sheeting and is available from Loretex Corporation, Guilderland Center, N.Y. 12085 as D/C UV Natural sheeeting. As illustrated, the zipper is a double-pull zipper, as indicated by the pulls 182 and 184 and has two box and pin ends 186 and 188 for coupling and uncoupling the elongate zipper portions 168 and 170. The double-pull zipper structure provides for a "peel down" variable, regulated ventilation for the greenhouse as well as complete removal of the cover end portions.

FIG. 7 illustrates a push-in/pull-out retainer 162 which includes a shaft portion 164 carrying a mushroom-shaped head 166. The shaft portion 164 is connected to a flange 168 which acts as a stop and carries a pair of outwardly-bowed and biased flexible fingers 170 and 172 which are joined together at their distal ends by an end portion 174 to form a pointed end for the retainer.

The retainer 162 is illustrated in FIG. 8 prior to insertion into an aperture 110 to connect the ridge T fitting 48 to the cover 14. Also shown are aperatures 96 and 98 for connecting the fitting 46 to the rafter tubes 50 and 56 and an aperture 108 for connecting the ridge tube 42 to the ridge end T fitting 46.

It should be pointed out that either type of retainer may be employed as the only type of retainer in practicing the invention. Other types of retainers which can provide the quick assembly and disassembly of the greenhouse as disclosed herein may also be employed.

Referring to FIG. 9, a flexible Ω-shaped plastic clip 190 is illustrated as including an arcuate section 192, sized to receive a base tube therein, and having a pair of outwardly-flared ends 194 and 196. The clips 190 are mounted on the base side and base end tubes as illustrated in FIGS. 1 and 6 with the cover marginal portions wrapped at least partially about the respective base tubes and thereby held thereto by the clips 190.

Turning now to FIG. 10, a fragment of the cover portion 158 is illustrated showing a detailed view of the cover at and below each of the flanges 168 of the the retainers 162. The fragment is seen to inlcude an aperture 159 in the sheeting material. These apertures, as evident, are spaced in the pattern of the retainers 162 to receive the respective end head 166 and the respective shaft 164 therethrough. A plastic grommet 166 having a self-adhesive backing is attached to the cover material encircling the aperture 159 for structural integrity by providing strain relief. As is evident, the aperture 159 and its grommet 166 may be buttoned and unbuttoned over the head 166 and shaaft 164 for rapid attachment and removal of the center cover portion 158.

Referring to FIG. 11, a storage and transport bag is generally illllustrated at 198 as including a bag cargo portion 200 terminated by a drawstring closure 202 having a drawstring 204 therein. The bag 198 may be constructed of any suitable material such as, for example, nylon, and may also have a carrying handle 206 and/or a shoulder strap 208.

Upon disassembly of the greenhouse, the individual components thereof may be placed in to the bag cargo portion 200 for storage and transport. The glued connetions may be provided by the manufacturer. If not, however, it will be appreciated that, upon disassembly, there will be fewer loose parts than used in the initial assembly in that the vertical tubes 76, 78, 80, 82, 84, 86 should be glued to the base T and SOLfittings 20, 22, 24, 30, 32, 34 and the transition angle fittings 64, 66, 68, 70, 72, 74.

Although we have described our invention by reference to certain illsustrative embodiments thereof, many changes and modifications of the invention may become apparent to those skilled in the art without departing from the spirit and scope of the invention. All such changes and modifications are intended to be included within the scope of our contribution to the art.

We claim:
1. A greenhouse comprising:
a rectangular base frame including first, second, third and fourth hollow end side outlet L SOL fittings, a first plurality of axially-aligned base side tubes coupled in tandem to and between said first and third SOL fittings, a second plurality of axially-aligned base side tubes coupled in tandem to and between said second and fourth end SOL fittings, first and second base end tubes respectively coupled to and between said first and third end SOL fittings and to and between said second and fourth end SOL fittings, and a plurality of hollow intermediate base T fittings each coupling adjacent ones of said base side tubes in tandem;
a rectangular gable-shaped roof frame above said base frame including first and second hollow ridge end T fittings, a ridge including a third plurality of axially-aligned ridge tubes coupled in tandem between said first and second ridge end T fittings, a hollow ridge intermediate cross fitting coupling adjacent ones of said ridge tubes in tandem, and a plurality of rafter tubes respectively coupled to said ridge end T fittings and said ridge intermediate cross fitting;
a plurality of vertical side members supporting said roof frame above said base frame and each including a vertical tube coupled to a respective one of said base frame SOL and intermediate base T fittings, a plurality of angular transition fittings each coupled to a respective one of said vertical tubes and each coupled to a respective one of said ridge end T and ridge intermediate cross fittings,
each of the couplings of said base end SOL fittings to said base frame end tubes, of said ridge end T and ridge intermediate fittings to said ridge and rafter tubes, respectively, and said angular transition fittings to the respective rafter tubes is a quick-release connect/disconnect connection comprising a respective hollow section, including a respective section wall in the respective fitting for receiving a respective tube therein, the respective tube including a tube wall, respective edges in said tube wall and said section wall defining registered first apertures, and a plurality of push-in/pull out first retainers each received in the respective registered first apertures,
each of said first retainers comprising an elongate shaft including a proximal end, an enlarged head terminating said proximal end, a flange extending transversely of said elongate shaft, and a flexible portion including a pair of biased fingers forming a distal end extending from said flange for yieldable engagement with said edges of the respective registered first apertures upon insertion and withdrawal thereof; edges in each of said ridge T end and the respective transition fittings coupled thereto defining registered second apertures;
a plurality of push-in/pull-out second retainers each comprising a proximal end including an elongate portion and a head on said elongate portion terminating said proximal end, a flange extending from and transversely of elongate portion for engaging the respective fitting, and a pair of outwardly-biased fingers for yieldable engagement with the respective edges of the respective registered apertures as the respective second retainer is inserted and withdrawn from the respective apertures; and
a cover including a center portion extending over said vertical members and said roof frame, and means in said cover defining a plurality of third apertures through said center portion of said cover spaced in accordance with the spacing of said plurality of second retainers, and a plurality of grommets each attached to said center portion of said cover encircling and reinforcing a respective third aperture, each of said third apertures in said center portion of said cover and its respective surrounding grommet receiving said head and elongate portion of the respective second retainer therethrough releasably connecting said center portion of said cover to said greenhouse frame, a pair of cover end portions shaped conforming to the shape defined by the respective base end tubes and the vertical side members and rafter tubes coupled to said vertical side members, each of said end cover portions including an upper end, a lower end and marginal edges, and a pair of double-pull zippers for each end cover portion and each including first and second ends, an open/close pull and a pair of elongate toothed portions, one of said toothed portions attached to said center portion of said cover and the other of said toothed portions connected to a marginal edge of the respective end portion, said first ends of each of said zippers of a respective end cover portion adjacent said first end of the other zipper of the respective end cover portion centrally of the respective upper end and said second ends of each pair of said zippers spaced the width of said lower end of the respective end cover portion so that said end cover portions may be selectively partially opened and closed and fully opened and closed.

2. The greenhouse of claim 1, wherein:

each of said elongate toothed portions of each of said zippers comprises two ends; and a pair of box and pin couplers each attached at a respective pair of elongate toothed portion ends for complete removal of said end portions of said cover.

3. The greenhouse of claim 1, and further comprising:

a drawstring bag for storage of the named components upon disassembly of said greenhouse.

4. The greenhouse of claim 1, wherein:

said head of each of said first retainers is a flat head.

5. The greenhouse of claim 1, wherein:

said head of each of said second retainers is a mushroom-shaped head.

6. The greenhouse of claim 1, wherein:

each of said grommets is a plastic grommet.

7. The greenhouse of claim 1, wherein:

each of said grommets is an adhesive-backed grommet, providing press-on attachment to said center portion of said cover.

8. The greenhouse of claim 1, wherein:

each of said grommets is an adhesive-backed plastic grommet providing press-on attachment to said center portion of said cover.

9. The greenhouse of claim 1, and further comprising:

glue connecting said vertical tubes to said base T and end SOL fittings, respectively, and to said transition fittings.

10. The greenhouse of claim 1, wherein:

said center portion of said cover comprises a marginal section and said end portions of said cover each comprise a marginal section, said marginal sections at least partially wrapping about the respective base side and base end tubes; and further comprising a plurality of Ω-shaped clips attaching said marginal sections to said base frame side and base end tubes.

* * * * *